Patented Aug. 22, 1944

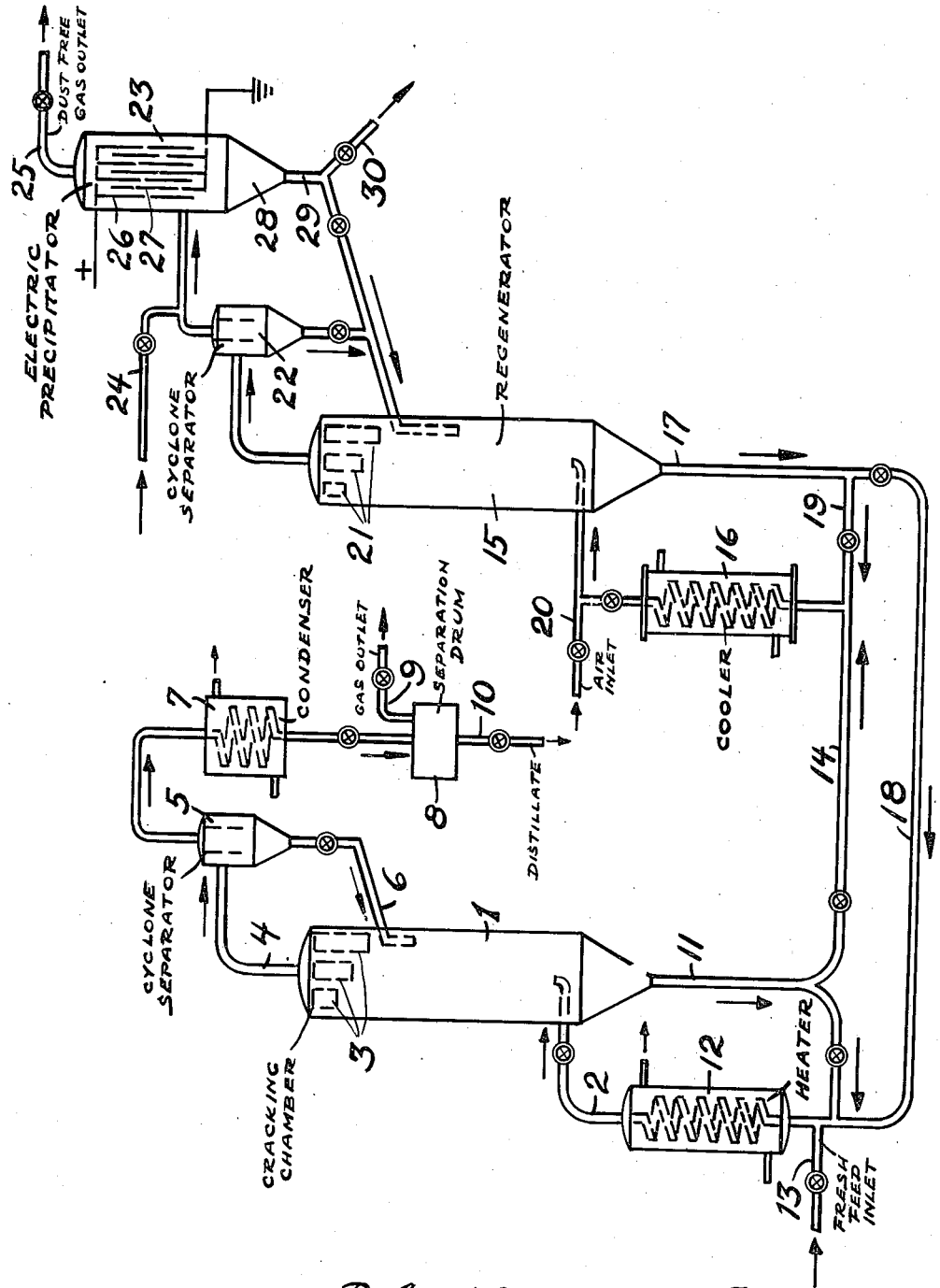

2,356,717

UNITED STATES PATENT OFFICE 2,356,717

RECOVERY OF FINELY DIVIDED SOLID MATERIALS

Robert W. Williams, Baton Rouge, La., assignor to Standard Oil Development Company, a corporation of Delaware Application December 15, 1942, Serial No. 469,111

8 Claims. (Cl. 23—1)

The present invention relates to the handling of finely divided solid materials or liquid particles and more specifically to improvements in the recovery of such materials from vapors and gases. The invention will be fully understood from the following description.

The drawing is a semi-diagrammatic view in sectional elevation of an apparatus for cracking oils by use of a finely divided powdered catalyst, including the step of regenerating the catalyst and recovering the regenerated catalyst from regeneration gases.

Recovery of finely divided solids or of liquid particles from gases and vapors has long been a difficult problem in various industries and many different types of equipment have been devised. In some instances recovery is necessitated by the nature of the solid itself which cannot be discharged into the atmosphere without discomfort or even danger and in other instances the material is of such value that the economic position of the particular process is completely determined by the degree of recovery obtained. Among the different types of recovery equipment electrostatic precipitators have been known for many years but their operation is apparently not even yet fully understood and in many instances carefully designed equipment fails to produce the degree of recovery predicted and desired.

It has now been found that in many instances the presence in the gases of a relatively small amount of ammonia, an ammonia yielding compound, such as an ammonium salt, will greatly increase the efficiency of the electrostatic precipitator. The reason for this improvement is not at present fully understood but the fact has been demonstrated that in many cases the recoveries may be greatly improved by the addition of the ammonia. In many instances difficulty is encountered in maintaining the desired voltage and there is evidence of arcing across the plates. It is found that these losses can be easily corrected by the aforesaid addition of ammonia. Even though arcing is not visually apparent there is frequently a large leakage loss that can be diminished by the addition of ammonia.

While the present invention is of broad and general scope, dealing with the separation of various types of solid from gases or vapors and liquid particles from smoke, mist and the like, it is of greatest interest in the chemical, petroleum and metallurgical fields where solids are to be removed from treating gases. It is also of considerable general value in connection with processes which are conducted with solids in a fluidized state. A large proportion of the solid particles may be separated by means of different types of mechanical separators based on centrifugal principles, but it is generally desirable to also subject the residual gas to electrostatic separation for a final recovery of the solid.

To illustrate the present invention, it will be described in connection with a process for cracking petroleum by means of a fluidized catalyst in which the catalyst is regenerated by means of regeneration gas and the catalyst particles are recovered from the gas by an electrostatic separator. It will be understood, however, as indicated above, that this is merely illustrative and the principles may be readily applied to separation of other solids whether they have been used as catalysts, reactants or inert added materials. It is also possible that the principles may be used in recovering minute liquid droplets from gas or vapor streams.

Referring to the drawing, numeral 1 denotes a cracking chamber in the form of a vertical cylinder in which petroleum is cracked in the presence of a fluidized cracking catalyst. The fluidized mixture of the catalyst and the oil vapors enters by pipe 2. In the upper portion of the vessel 1, multiclone separators are indicated generally at 3 and are used to return a substantial portion of the finely divided catalyst to the reaction chamber for further use. The vapor passes overhead by pipe 4 to a secondary cyclone separator 5 and more of the separated solid is returned to the reaction chamber by the pipe 6. The hot gases and vapors are now relatively free of solids, and pass into a condenser 7 and the separation drum 8 from which the permanent gas is taken off by pipe 9 and condensed cracked distillate is removed by pipe 10. A stream of fluidized solids is withdrawn from the lower end of the reactor 1 by means of a pipe 11 and a portion of this stream may be circulated through a heater 12 into which the fresh feed is also discharged by a pipe 13. The heater discharges again into the reactor 1 so that a cycle is provided by means of which heat is added to the reactor.

Another portion of this stream flowing through pipe 11, which contains a rather large proportion of spent catalyst, that is to say catalyst which is coated with carbon, is passed from the pipe 11 through pipe 14 and into the regenerator 15 by way of cooling coil 16. The regenerator may be a vertical cylinder similar to reactor 1. Pipe 17 from the lower portion of the regenerator carries a part of the regenerated catalyst by means of a circulating line 18 back to the cracking reactor by way of the heater 12, referred to above, and another portion is recirculated by pipe 19 through a cooler 16 and returns to the regenerator 15. Air or other regenerating gas may be fed into the regenerator, for example, by pipe 20.

In the upper portion of the regenerator 15, multiclones 21 are provided and the gas still containing some solid particles passes to a cyclone 22. This equipment can, of course, be eliminated if desired, but it is preferable to reduce the size of the electric precipitator 23 and to include some mechanical separating devices for the vapors and gases which are relatively rich in solid. Ammonia, or ammonia yielding compounds, are introduced into the inlet leading to the precipitator 23 by means of a pipe 24 and the dust-free gas passes from the precipitator by means of a pipe 25 after it has passed between the charged plates 26 and 27. The finely divided solid is largely preciptated upon the collector plates and falling therefrom is collected in hopper 28 and is returned by pipe 29 to the regenerator, or it may be taken off by pipe 30. It will be understood that the electrostatic separator may be of any preferred design, the particular design being no part of the present invention. It is generally, preferred, however, to provide vertical collector plates which are vibrated continuously or periodically so as to remove the accumulated solid particles. The collector plates are preferably grounded while the corona-forming discharge electrodes may be in the form of similar plates, wires, wire grids, edges, points, or the like. The gas flow is usually parallel to the collector plates with the discharge electrodes parallel or pendicular to this flow.

As stated above, the particular form of the separator, the electrodes, the potential difference maintained and other conditions of operation are no part of the present invention, but it may be stated that in general the gap between the plates is from ½ to 6 inches and potential differences of 50,000 to 90,000 volts are normally applied across the electrodes.

The amount of ammonia injected into the gases fed into the separator may vary over a wide range and the most effective amount depends on many different factors such as the particular solid to be separated, the characteristics of the gases, the electrical conditions, amount of solids in the gas and the like, but surprisingly small amounts of ammonia, or other suitable material, under particular conditions are found to produce remarkable improvements and it is best to begin with a relatively large amount and to decrease this slowly until the best conditions are obtained. This can be readily accomplished without unreasonable experimentation but in general good results are obtained with from 1 to ½ pounds of ammonia to each ton of catalyst.

There is some reason to believe that the presence of ammonia in the solid is in fact the controlling consideration. For example, the addition of gaseous ammonia is not immediately felt and there is apparently some time required which may indicate that it is necessary for the ammonia or a portion of it to be adsorbed on the catalyst or on the solid. Materials with high adsorbent properties for ammonia are much more readily affected than other materials which do not possess such properties.

With gaseous ammonia there is no difficulty whatever in injecting it at the inlet pipe leading to the electrostatic separator, but it may be introduced elsewhere in the system if desired and, indeed, may be introduced directly into the separator if so desired. Ammonia yielding substances may be used instead of ammonia itself, for example, salts of ammonia, especially the sulfate, chloride, nitrate, acetate, oxalate, or other salts may be introduced where temperatures prevail such that they will yield ammonia for the present purposes. In some instances where the gases and vapors are sufficiently hot to cause evaporation of water, aqueous solutions of the ammonia and salts are the preferred source of ammonia. Care should, of course, be taken where catalytic processes are involved to insure that the accumulated sulphate or chloride, or other materials, are not objectionable to the particular catalytic reaction. In some instances the catalyst or other solid may be employed to carry the ammonia into the system. For example, the solid may be saturated with ammonia and fed into the equipment continuously or at intervals as it is used, the amount of ammonia being adjusted so as to supply the desired amount in the subsequent separation stage. Many catalysts consisting of metallic oxides are prepared by precipitation of metallic salts by means of ammonia, some of which remains in the catalyst and is gradually expelled by heat. Frequently the amount of ammonia expelled in such a way is sufficient for the process or at least is sufficient to supply a substantial portion, if not all, of the ammonia required in the separation stage. In such a case where fresh catalyst is added continuously or at intervals, the fresh catalyst may serve as a convenient carrier for introducing ammonia into the separator.

As an example of the operation of the present invention, its application to a catalytic cracking process will be specifically set forth. The oil is cracked by means of a synthetic, highly adsorptive gel catalyst consisting principally of silica and alumina. This catalyst is in very finely divided form, a large percentage of the particles being smaller than 40μ. The catalyst becomes coated with carbon during the cracking stage and is regenerated by burning with air at a temperature of 900 to 1100° F. The catalyst and air form a fluidized mixture which flows through the catalyst regenerator without difficulty. The coke is thus burned from the catalyst and a considerable portion of the catalyst is easily separated by mechanical separators as described heretofore. The residual gas discharged from the mechanical separators consists of combustion gas generally with some additional steam and contains from .004 to .02 pound of solid material per cubic foot of gas measured at 60° F. and atmospheric pressure. When this gas is supplied to an electrostatic separator at a temperature of about 400–450° F., under essentially atmospheric pressure, with a gap varying from four to six inches between the electrostatic plates across which a potential of 70,000 volts is maintained, the loss of powder through the system amounts to about .00075 pound per cubic foot of residual gas measured at 60° F., atmospheric pressure, or 5 grains/cu. ft. There is also found to be some difficulty in maintaining the potential across the plates and there is evidence of arcing at particular points.

After ammonia is injected into the gas flowing to the electrostatic separator, it is observed that the voltage is more readily maintained and there is no evidence of arcing. The amount of ammonia added is .19 to .38 pound of $NH_3$ per thousand pounds of catalyst. It is observed that the loss of powder from the electrostatic separator is gradually decreased from the figure given above and now amounts to .025 grain to .075 grain per cubic foot of residual gas.

In other studies gas containing the solid was bled from large scale cracking equipment and was passed through a cell for measuring resistivity. The cell consisted of a small disc collection plate and a sharp pointed electrode, the end of which is about two inches from the center of the plate. A potential difference of say 20,000 volts may be maintained across these electrodes and the voltage may be varied as desired or may be maintained constant while the material passes through the cell. Flow of the current between the electrodes can also be measured. When a batch of fresh catalyst containing ammonia was added to the large scale cracking unit, it was found that the resistivity in the cell was gradually diminished with time. When the resistivity as measured in the above cell was below about $2 \times 10^{10}$ or $2 \times 10^{11}$ ohms centimeters, the operation of the electrostatic precipitator was very good and the powder losses were consequently small. When the resistivity as measured by the cell rose above the range given, the losses became larger.

As a specific instance, when fresh catalyst is added the resistivity recorded was $5 \times 10^6$ ohms centimeters before heating. About three hours after the addition of fresh catalyst to the cracking unit and while such addition is continuing the resistivity was $2 \times 10^{10}$ and 5 hours later it was $5 \times 10^9$ fresh catalyst being added all the while. Addition of fresh catalyst was now stopped and after 14 hours the resistivity was found to be $3 \times 10^{11}$. Recovery as stated before was found to be good while the resistivity was below the range $2 \times 10^{10}$ to $2 \times 10^{11}$, and poor above this range.

In the same manner the addition of ammonium sulphate or gaseous ammonia brought the resistivity down and improved the loss of power.

In further studies on a large plant, powder recovery was recorded generally as follows:

Noon:
  Normal operation
  No fresh catalyst being added
  No ammonia
  Powder recovery 97.5%

2 p. m.:
  Fresh ammonia containing catalyst being added
  Recovery increased to 99.7%

6 p. m.:
  Fresh catalyst addition was stopped and the catalyst recovery was found to continue at the above figure for 13 hours.

In a further series of tests when ammonia was added, the recovery was found to be about 99.7% to 99.9%, the ammonia being added throughout the period.

The present invention is not to be limited to the employment of any particular ammonia compound, nor to any specific method of injection of the compound, nor is it to be limited to the recovery of the powder from any particular gas, or any particular type of solid or liquid particles, but only to the following claims in which it is desired to claim all novelty inherent in the invention.

I claim:

1. An improvement in the separation of suspended particles from vapors or gases which comprises adding a substance selected from the class consisting of ammonia and ammonia yielding substances to the suspension and subjecting the same to electrostatic separation.

2. An improvement in the process of separating particles of adsorptive solids from a flowing stream of gases or vapors in which such solid particles are suspended which comprises adding a small amount of a substance selected from the class consisting of ammonia and ammonia yielding substances to the suspension and subjecting the same to electrostatic separation.

3. Process according to claim 2 in which an ammonium salt is employed.

4. Process according to claim 2 in which ammonium sulphate is employed.

5. Process according to claim 2 in which ammonium chloride is employed.

6. An improved process for separating solid particles from a gas stream which comprises adding ammonia to the solid adsorbent particles, adding the same to the gas stream and subjecting the suspension to an electrostatic separation.

7. An improved process for carrying out catalytic reactions with suspended solid catalyst particles in the vapor phase which comprises adding catalyst, capable of yielding ammonia under heating, to the vapor undergoing reaction, passing the suspended catalyst through the reaction zone and thereafter subjecting the suspension to electrostatic action so as to separate the solid particles from the vapors.

8. Process according to claim 2 in which gaseous ammonia is employed.

ROBERT W. WILLIAMS.